(12) United States Patent
Liu

(10) Patent No.: US 7,779,774 B2
(45) Date of Patent: Aug. 24, 2010

(54) INDICATING INSTRUMENT WITH LIGHT POINTER

(75) Inventor: Tianjin Liu, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 495 days.

(21) Appl. No.: 11/656,906

(22) Filed: Jan. 23, 2007

(65) Prior Publication Data

US 2008/0173233 A1    Jul. 24, 2008

(51) Int. Cl.
*G12B 11/00* (2006.01)
(52) U.S. Cl. .................... 116/286; 116/284; 116/300
(58) Field of Classification Search ......... 116/284–289, 116/309–310, DIG. 6, DIG. 36, 300–301, 116/62.1, DIG. 5
See application file for complete search history.

(56) References Cited

U.S. PATENT DOCUMENTS

| | | | | |
|---|---|---|---|---|
| 4,324,197 | A * | 4/1982 | Parfitt | 116/300 |
| 5,143,434 | A * | 9/1992 | Ohta et al. | 362/29 |
| 5,211,128 | A * | 5/1993 | Katoh et al. | 116/288 |
| 5,353,735 | A * | 10/1994 | Arai et al. | 116/286 |
| 5,566,140 | A * | 10/1996 | Kohata et al. | 368/220 |
| 6,178,917 | B1 * | 1/2001 | Jansa | 116/286 |
| 6,206,533 | B1 | 3/2001 | Shi | |
| 6,333,697 | B1 * | 12/2001 | Kumazawa et al. | 340/815.4 |
| 6,456,260 | B1 | 9/2002 | Koenig et al. | |
| 6,557,485 | B1 * | 5/2003 | Sauter | 116/284 |
| 6,663,251 | B2 | 12/2003 | Calvert | |
| 6,980,729 | B2 | 12/2005 | Shi | |
| 7,097,316 | B2 * | 8/2006 | Sumiyoshi | 362/28 |
| 7,305,932 | B2 * | 12/2007 | Hildebrand et al. | 116/301 |
| 7,448,341 | B2 * | 11/2008 | Cook et al. | 116/286 |

FOREIGN PATENT DOCUMENTS

| | | | | |
|---|---|---|---|---|
| JP | 2002162259 A | * | 6/2002 | |
| JP | 2003215142 A | * | 7/2003 | |

* cited by examiner

*Primary Examiner*—R. A. Smith
*Assistant Examiner*—Tania C Courson
(74) *Attorney, Agent, or Firm*—Harness, Dickey & Pierce, PLC

(57) ABSTRACT

A vehicle may utilize a faceplate, such as a non-circular faceplate, as part of an indicating instrument, such as a speedometer, in a dashboard. The speedometer utilizes a laser to direct laser light onto or through indicia, adjacent a numerical scale, of the faceplate. A first motor mounted to a printed circuit board is used to rotate the laser in a first plane, and a second motor is used to rotate the laser in a second plane. The laser may reside in a housing having a slit or slot for the laser light to pass through to illuminate the faceplate indicia. The first motor is mounted between the printed circuit board and the second motor while a connecting post may be utilized between the first and second motors to position the laser closer to the faceplate indicia, depending upon spatial packaging requirements and the laser light of the laser.

11 Claims, 4 Drawing Sheets

INDICATING INSTRUMENT WITH LIGHT POINTER

FIELD

The present disclosure relates to an indicating instrument with a pointer mechanism that is capable of directing concentrated light, such as laser or LED light, around the periphery of a faceplate to indicate positions of a scale.

BACKGROUND

The statements in this section merely provide background information related to the present disclosure and may not constitute prior art. Indicating instruments or gauges, such as speedometers, for viewing by drivers of vehicles are generally analog in construction and display operational information such as vehicle speed. An analog gauge may also typically include a faceplate having a numerical scale, such as mile per hour ("mph") markings, and indicia to denote levels of the scale and a corresponding mechanical pointer, which rotates around the scale to indicate precise positions of the scale. While such analog indicating instruments have generally proven satisfactory for their intended purposes, they have been associated with their share of limitations.

One such limitation of current analog indicating instruments is their inability to indicate markings on non-circular gauges. Because many analog indicating instruments are circular with a rigid pointer disposed at the center of the circular scale, with the rigid pointer or indicator rotating about the gauge center, gauges and their associated numerical scales must be constructed in a circular shape. If such gauges were non-circular, pointers located at the circular center of the gauge may move outside of the gauge boundary as a pointer of a fixed length rotates about the numerical scale. More specifically, using an elliptical gauge with an elliptical faceplate as an example, if a rigid pointer is constructed with a pointer extending from a center of the ellipse to an end of the major axis of the ellipse, the pointer will extend outside of the boundary of the elliptical faceplate as the rigid pointer moves toward and past an end of the minor axis of the elliptical gauge. Because the pointer must move beyond an end of the minor axis, it may strike another part of the gauge or another adjacent structure and posses an unbecoming appearance.

Another limitation of current vehicles employing circular analog indicating instruments relates to gauge packaging in a vehicle dash. More specifically, when all gauges installed in a vehicle dash are constructed in a circular fashion, the remaining dash area is not of a convenient shape to package other items, whether they are additional gauges, LCD displays, etc.

What is needed then is a device that does not suffer from the above disadvantages. This, in turn, will provide a non-circular indicating instrument, with a corresponding pointer, that may be conveniently packaged in a vehicle dash.

SUMMARY

In a vehicle dashboard, an indicating instrument may utilize a faceplate, such as a non-circular faceplate, along with a numerical scale, corresponding indicia, and a laser that directs laser light onto the faceplate to illuminate the indicia. In such an instrument, the laser is a pointer. To control the direction of the laser light about the face of the gauge, a first motor may be employed to rotate the laser in a first plane, while a second motor may be employed to rotate the laser in a second plane. Through the coordinated rotations of the motors, the laser light may be directed to any indicia about a non-circular faceplate.

Regarding motor mounting, the first motor may mount to a printed circuit board, while the second motor may be mounted on top of the first motor, or alternatively, a connecting post may be utilized between the first and second motors to position the laser closer to the faceplate indicia, depending upon spatial packaging requirements and the laser light of the laser. The laser may reside within a housing, which may also house the second motor, that defines a slit or slot for passage of laser light.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
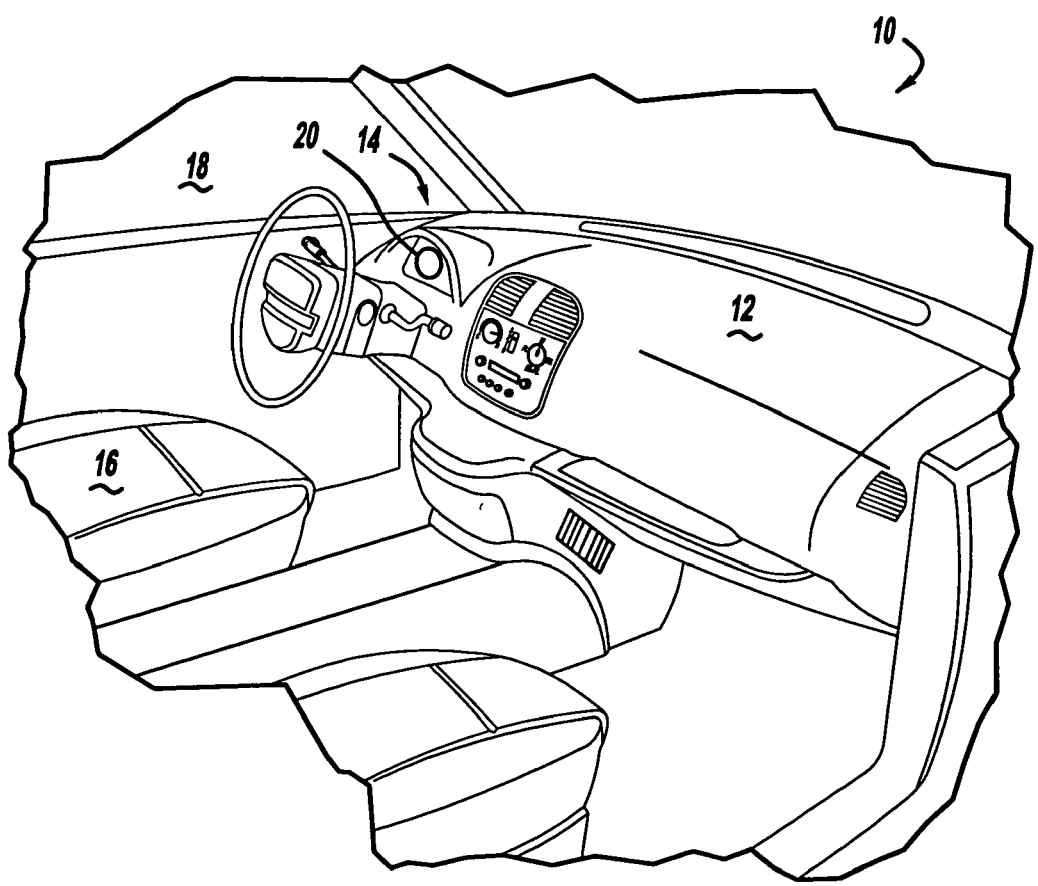
FIG. 1 is a perspective view of an interior dash of a vehicle depicting a location of an indicating instrument.

The following description is merely exemplary in nature and is not intended to limit the present disclosure, application, or uses. It should be understood that throughout the drawings, corresponding reference numerals indicate like or corresponding parts and features. Turning now to FIGS. 1-7, the teachings of the present invention will be explained. With initial reference to FIG. 1, depicted is a vehicle 10 having a dash 12 and an instrument cluster 14, both of which may be situated in front of a driver's seat 16 in the interior cabin 18 of a vehicle 10. As part of the instrument cluster 14, a viewed component 20, also known as an indicating instrument or gauge, is depicted. It should be appreciated that the viewed component 20 may be exemplified by other gauges or indicating instruments, such as a tachometer. Hereinafter, for exemplary purposes and ease of reference, the viewed component 20 will be referred to as a speedometer.

Figure 2:
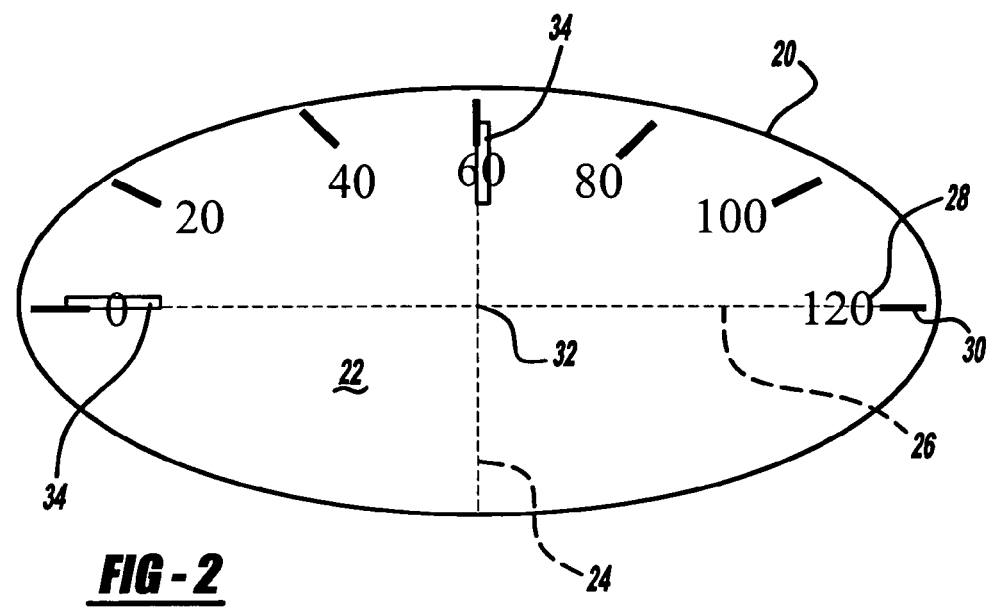
FIG. 2 is a front view of a non-circular indicating instrument in accordance with an embodiment of the present invention.

Turning to FIG. 2, a speedometer 20 is depicted in accordance with the present invention. More specifically, a speedometer faceplate 22 is formed in the shape of, or that closely approximating, an ellipse having a minor axis 24 and a major axis 26, which will be used as reference lines for purposes of explaining the invention. Continuing, the speedometer 20 has a numerical scale 28 and indicia 30, which are individual markings that denote specific positions of the numerical scale 28. For illustrative purposes and clarity, the markings of the laser pointer 34 on FIG. 2 are depicted slightly aside of the actual indicia 30. Furthermore, throughout the description, the light emitted from the laser 36 may be referred to as laser light, a laser beam or simply as a laser pointer; such references are meant to refer to the same light emitted from a laser, LED or other concentrated light source. A faceplate center 32 denotes the intersection of the minor axis 24 and the major axis 26. The laser pointer 34 illuminates the indicia locations on the faceplate 22 that correspond to specific locations on the numerical scale 28. For instance, exemplary illuminated locations by the laser pointer 34 are noted at the indicia 30 at the "0" mph location and the "60" mph location on the faceplate 22.

Figure 3:
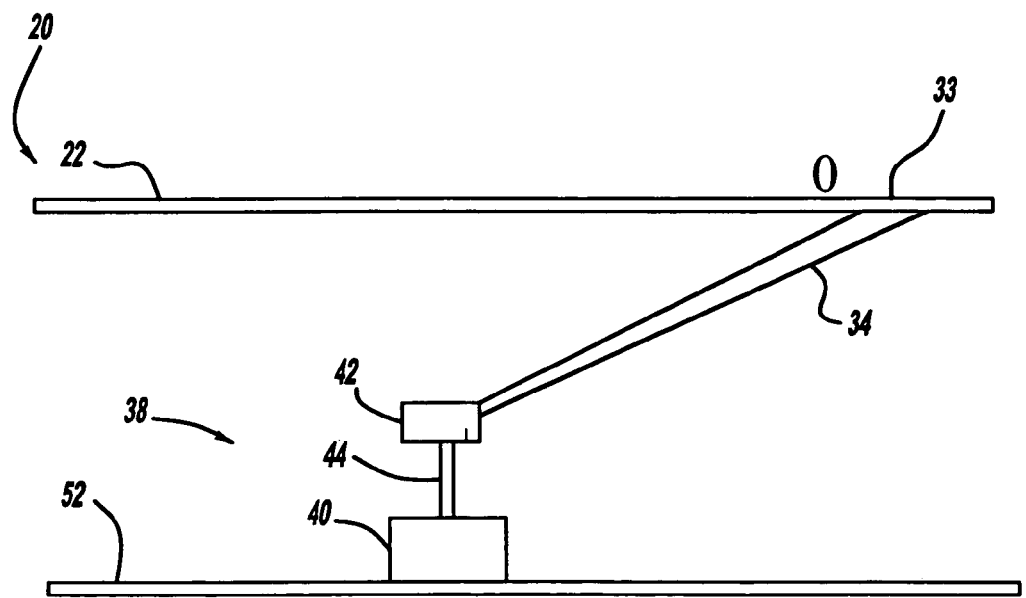
FIG. 3 is a side view of a non-circular indicating instrument in accordance with an embodiment of the present invention.
Figure 4:
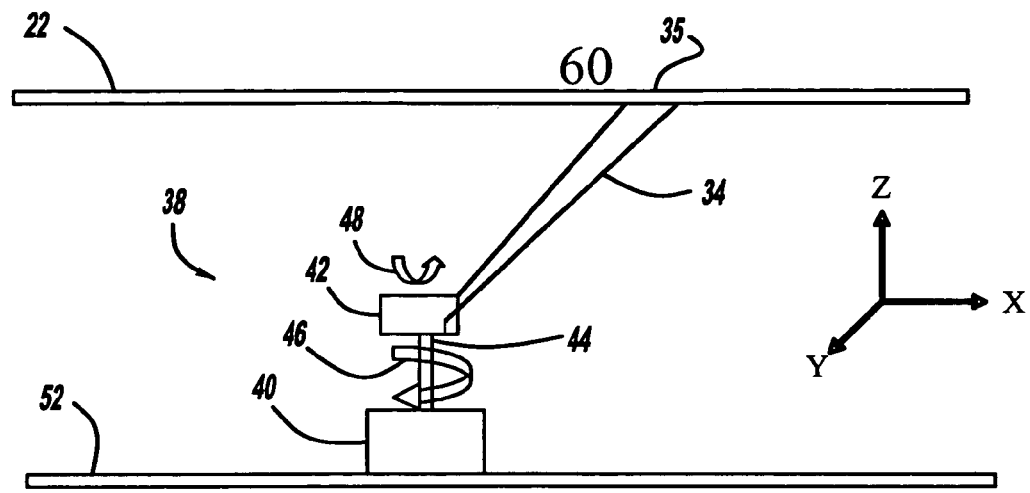
FIG. 4 is a side view of a non-circular indicating instrument in accordance with an embodiment of the present invention.

Turning to FIG. 3, a side view of the non-circular indicating instrument of FIG. 2 is depicted. More specifically, FIG. 3 depicts positioning of the laser pointer 34 when a laser 36 (FIG. 6) directs light through the faceplate 22 to the position "0" of FIG. 2, which appears as a lit area 33 to a viewer, while FIG. 4 depicts positioning of the laser pointer 34 when the laser 36 (FIG. 6) directs light through the faceplate 22 to the position "60" of FIG. 2, which appears as a lit area 35. The lengths of the laser beams 34 in FIGS. 3 and 4 are shown as different lengths because of the elliptical shape of the faceplate of FIG. 1. That is, in the side view of FIG. 3, the length of the laser pointer 34 is the straight line from the gauge center 32 to the indicia 30 at "0" mph, while in the side view of FIG. 4, the length of the laser pointer 34 is the straight line from the gauge center 32 to the indicia 30 at "60" mph.

As depicted in FIG. 2, the laser light is visible through the faceplate 22 at the specific indicia at which the laser pointer 34 is directed and provides clear, definitive illumination of the indicia 30 in daytime and nighttime lighting conditions. To view the laser pointer 34 through the faceplate 22 and experience a "virtual pointer" on the surface of the faceplate 22 at the indicia 30, the faceplate 22 or appliqué, also known as a display lens, may be manufactured from a semi-transparent or transparent material such as semi-transparent or transparent polycarbonate, which as a flexible plastic, offers strength, heat resistance, moisture resistance, and impact resiliency. Although a laser 36 is used as the source of light for the present invention, a light emitting diode ("LED"), or other confined, non-scattering, concentrated light beam may be employed.

FIGS. 3 and 4 generally depict a rotational mechanism 38 that directs the light from a light source 36, such as a laser. More specifically, the rotational mechanism 38 employs, in part, a first or lower motor 40, a second or upper motor 42, and a vertical or connecting post 44, which may be provided for proper spacing between the laser and the faceplate 22, depending upon gauge configuration. FIG. 4 depicts a rotational arrow 46 and a rotational arrow 48 that indicate rotational motions of the motors 40, 42. More specifically, the rotational arrow 46 depicts rotational movement generated by motor 40 about the vertical or "Z" axis in the clockwise and counterclockwise directions, while rotational arrow 48 depicts rotational movement generated by the motor 42 about the horizontal or "X" axis in the clockwise and counterclockwise directions. Furthermore, although rotations of the motors are depicted, such rotations result in like rotations or movements of the laser pointer 34. Such rotations or movements of the laser pointer 34 permits the laser pointer 34 to be directed about the periphery of a non-circular faceplate 22, such as that depicted in FIG. 1. FIGS. 3 and 4 also depict a printed circuit board ("PCB") 52 to which rotational mechanism 38 and more specifically, the first motor 40, are attached. The PCB 52 is a source of electricity for the motors 40, 42 and the laser 36.

Although not specifically depicted, upon the PCB 52 a control module or controller may be mounted and connected to the motors 40, 42 to direct the rotational movements of the motors 40, 42. The controller would receive instructions, which would be passed onto the motors 40, 42 in the form of motion instructions, in accordance with the changing speed of a vehicle to change the indicated speed on the faceplate 22.

Figure 5:
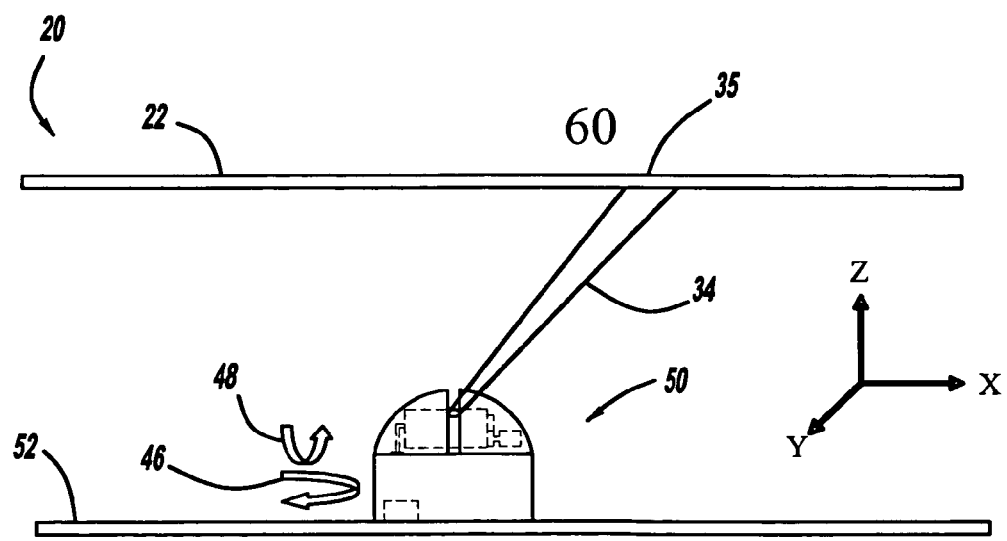
FIG. 5 is a side view of a non-circular indicating instrument in accordance with an embodiment of the present invention.

Turning now to FIG. 5, a side view of the non-circular speedometer 20, in accordance with an embodiment of the present invention, is depicted. The embodiment of FIG. 5 is similar to that depicted in FIGS. 3 and 4, with an alternate configuration of the motors 40, 42. That is, one difference between the rotational mechanism 38 of FIGS. 3-4 and the rotational mechanism 50 of FIG. 5 is that the connecting post 44 is removed in the embodiment of FIG. 5. FIG. 5 depicts a lower profile rotational mechanism 50 that provides the same rotational movements as the embodiment depicted in FIGS. 3-4. The use of the embodiments depicted in FIGS. 3-4 and FIG. 5 may depend upon the distance between the faceplate 22 and PCB 52 and the strength of the light source used to generate the pointer 34.

Figure 6:
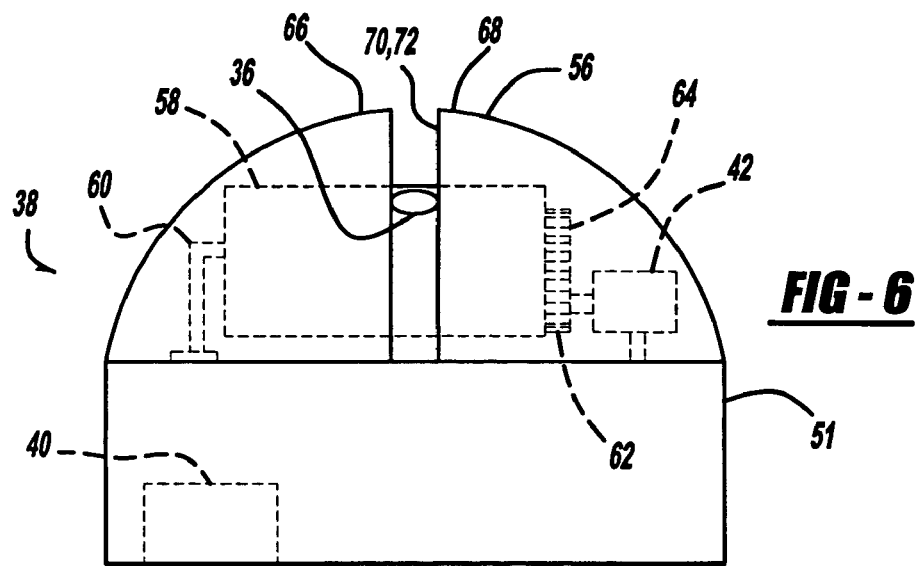
FIG. 6 is an enlarged side view of a rotational mechanism of a non-circular indicating instrument in accordance with an embodiment of the present invention.
Figure 7:
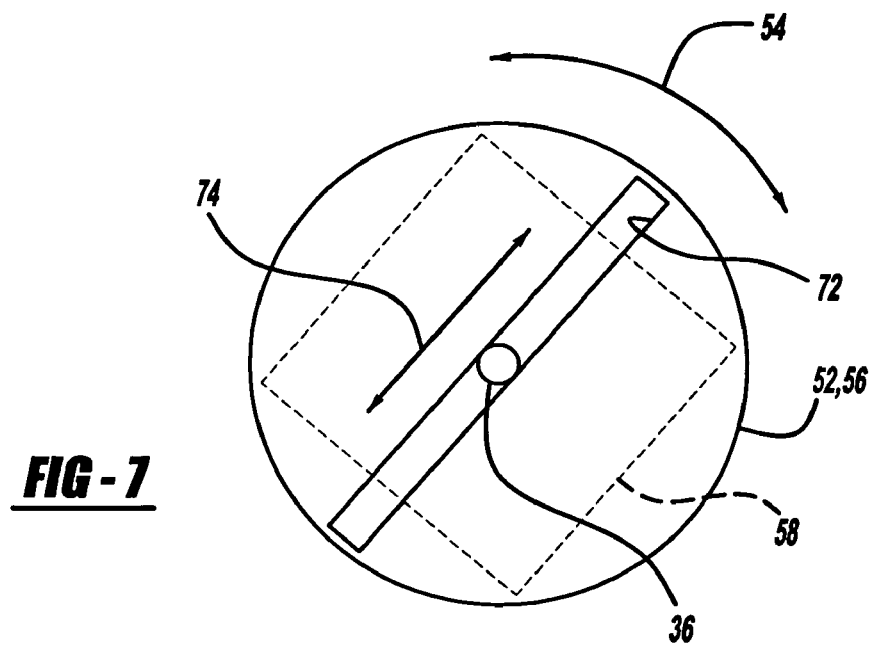
FIG. 7 is an enlarged top view of a rotational mechanism of a non-circular indicating instrument in accordance with an embodiment of the present invention.

Details of the rotational mechanism 50 of FIG. 5 will now be presented with reference to FIGS. 5-7. As in the embodiment of FIGS. 3-4, the rotational mechanism 50 draws electrical power from a printed circuit board 52 ("PCB") to power the motors 40, 42 and a pointer light source, such as a laser 36. When power is supplied to the motor 40 in the base unit 51, the motor 40 may rotate the base unit 51 clockwise or counterclockwise in accordance with arrow 54 in accordance with the speed of the vehicle 10. With reference to FIG. 1, when the base unit 51 rotates in accordance with arrow 54, the laser pointer 34 rotates about the periphery of the speedometer 20, for example, clockwise from "0" to "60" mph. However, because the speedometer 20 has an elliptical faceplate 22, with only the motor 40, the laser pointer 34 would rotate outside of the perimeter of the faceplate 22 and away from the indicia 30, beyond an end of the minor axis 24. To compensate for the elliptical shape of the faceplate 22, the laser 36, which resides within an upper unit 56, also rotates or moves to compensate for the elliptical shape of the faceplate 22. More specifically, the laser 36 may be moved along a full range of the minor axis 24 and major axis 26 noted on the faceplate 22 (FIG. 1), and axis between the minor and major axis, in accordance with the rotation of the first motor 40. Such movement of the laser 36 is facilitated by second motor 42.

Continuing with a description of the laser 36 and its motion, the laser 36 resides within a drum or cylinder 58, shown in phantom as an example, although other shapes are conceivable, within the upper unit 56. The cylinder 58 is capable of rotating on an axis that may be coincident with the entry point or attachment point of the support post 60 on the cylinder 58. The support post 60 may mount to a surface of the base unit 51, similar to the motor 42. The motor 42, powered from the PCB 52, may rotate a motor gear 62, which in turn rotates a cylinder gear 64. The upper unit 56 may be divided into two halves 66, 68 with a gap 70 between the halves 66, 68 (FIG. 6). Alternatively, the upper unit 56 may not be divided, but rather a slit or slot 72 may be formed in the upper unit 56, such as over the top of the upper unit 56. It is through the gap 70 or slot 72 that the laser pointer 34 of the laser 36 may be directed. More specifically, with the laser 36 rotating with the cylinder 58 when the motor 42 is activated in concert with the motor 40 in accordance with the speed of the vehicle 10, the laser 36 may be directed to specific indicia 30 on the faceplate 22. That is, the motors 40, 42 may both be activated at the same time as a vehicle speed increases or decreases.

Continuing with indicia lighting, to light specific indicia 30 of the faceplate 22 depicted in FIG. 2, the laser 36 may be situated under the faceplate center 32 on the PCB 52 such that if the laser pointer 34 were directed directly upward, laser light would pass through the center 32 of the faceplate 22. Continuing, it follows that with the same positioning of the rotational mechanism 50 and accompanying laser 36 under the faceplate 22, and on the PCB 52, regardless of how the base unit 51 and upper unit 56 is rotated, the laser pointer 34 may be aligned with the faceplate center 32 and any particular indicia 30. In moving about the faceplate periphery, the laser 36 may rotate within the upper unit 56 in accordance with arrow 74. Such a mounting is but one possible configuration on the PCB 52; other mountings, such as off-center, or not directly under the center of the faceplate 22, are foreseeable.

There are many advantages to the teachings of the present invention. With the use of a laser pointer 34, a multitude of faceplate 22 and indicating instrument shapes are possible because no mechanical, moving pointer is necessary to indicate speeds on the faceplate 22. Additionally, because the motors 40, 42 are small, micro-motors, they have a small package, permitting such to be used even in small gauges, such as traditional vehicle fuel gauges and temperature gauges. Additionally, by using a concentrated beam of light, such as a laser or LED, the faceplate 22 will have an aesthetically pleasing, progressive appearance as a "virtual pointer." Furthermore, sophisticated light directing techniques generally associated with lighting mechanical pointers are not required. Finally, because of the flexibility in directing concentrated laser light from one location on a PCB, gauge packaging within a vehicle dash may be more flexible regarding gauge placement and more efficient in terms of dash space utilized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a vehicle dashboard, an indicating instrument comprising:
   a faceplate;
   a laser to project laser light directly onto the faceplate;
   a first motor to rotate the laser in a first plane;
   a second motor to rotate the laser in a second plane; and
   a printed circuit board, the first motor mounted to the printed circuit board; wherein the first motors and second motors are mounted between the printed circuit board and the faceplate, wherein the second motor is located below the faceplate.

2. The indicating instrument of claim 1, further comprising:
   a connection post between the first and second motors.

3. The indicating instrument of claim 1, further comprising:
   a housing within which the laser resides.

4. The indicating instrument of claim 1, further comprising:
   a housing that defines a slit for passage of laser light.

5. The indicating instrument of claim 1, wherein the faceplate is non-circular.

6. The indicating instrument of claim 1, further comprising:
   indicia about a periphery of the faceplate, wherein the faceplate is non-circular.

7. The indicating instrument of claim 6, wherein the laser is directed to illuminate the indicia.

8. In a vehicle dashboard, an indicating instrument comprising:
   a non-circular faceplate;
   a laser to project laser light directly onto the faceplate;
   a first motor to rotate the laser in a first plane;
   a second motor to rotate the laser in a second plane; and
   a printed circuit board to which the first motor mounts, wherein the first motor is mounted between the printed circuit board and the second motor; wherein the second motor is located below the faceplate.

9. The indicating instrument of claim 8, further comprising:
   a numerical scale about the periphery of the faceplate; and indicia corresponding to the numerical scale.

10. The indicating instrument of claim 8, further comprising:
    a housing defining a slit for the laser light to pass.

11. The indicating instrument of claim 8, further comprising:
    a connecting post between the first and second motors.

* * * * *